United States Patent [19]

Roark

[11] 4,132,222

[45] Jan. 2, 1979

[54] SOLAR ENERGY COLLECTOR

[76] Inventor: Charles F. Roark, 24 Maple La., Brownsburg, Ind. 46112

[21] Appl. No.: 715,448

[22] Filed: Aug. 18, 1976

[51] Int. Cl.² .................................................. F24J 3/02
[52] U.S. Cl. ....................................... 126/271; 126/270
[58] Field of Search ................ 126/270, 271; 237/1 A

[56] References Cited

U.S. PATENT DOCUMENTS

| 2,872,915 | 2/1959 | Bowen | 126/271 |
| 3,866,285 | 2/1975 | Clark | 126/271 X |
| 3,923,039 | 12/1975 | Falbel | 126/271 |

FOREIGN PATENT DOCUMENTS

| 1094368 | 5/1955 | France | 126/271 |
| 1301853 | 1973 | United Kingdom | 126/271 |

*Primary Examiner*—William F. O'Dea
*Assistant Examiner*—Larry Jones
*Attorney, Agent, or Firm*—Woodard, Weikart, Emhardt & Naughton

[57] ABSTRACT

A collector assembly is provided in a semicylindrical configuration with a window exposed to solar radiation and a semicylindrical collector panel inside the housing with the convex face directly exposed to solar radiation and the concave face exposed to reflected radiation from a combination curved reflector surface inside, a portion of which is exposed directly to solar radiation.

7 Claims, 4 Drawing Figures

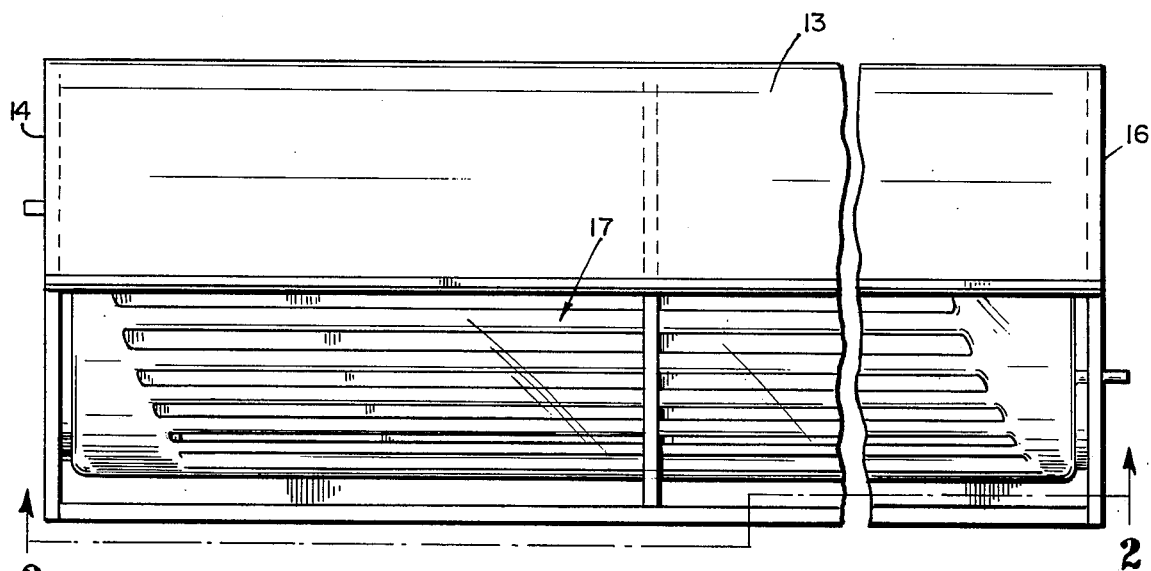
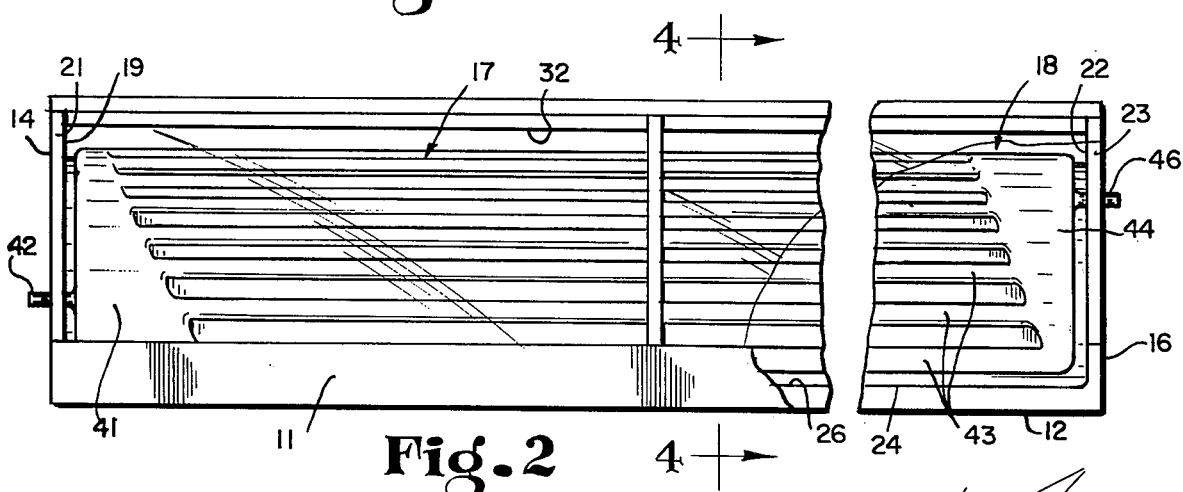
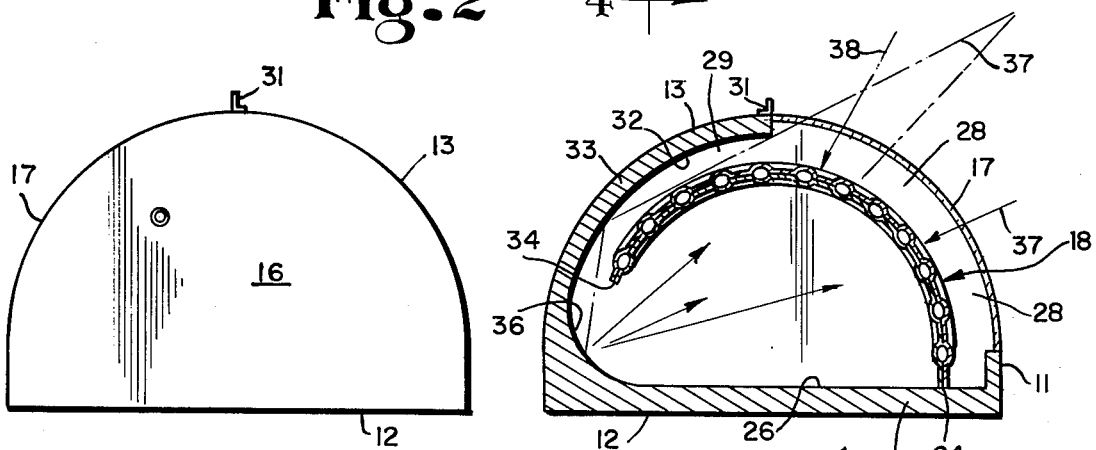

SOLAR ENERGY COLLECTOR

BACKGROUND OF THE INVENTION

1. Field of the Invention

This invention is generally related to solar energy collectors, and more particularly to collectors for stationary mounting and heat transfer to a working fluid.

2. Description of the Prior Art

A variety of solar collectors is known. An item of literature describing some of them is submitted herewith and is entitled "Baseline Solar Collector" apparently published by the PPG Industries, One Gateway Center, Pittsburgh, Pennsylvania 15222 and bearing on the cover a number G-483 15M35.

U.S. patents disclosing various types of solar energy receivers and/or utilization devices are as follows:

| U.S. Pat. No. | Inventor | Issue Date |
|---|---|---|
| 2,405,118 | Delano et al | Aug. 6, 1946 |
| 2,969,788 | Newton | Jan. 31, 1961 |
| 3,025,335 | Ralph | Mar. 13, 1962 |
| 3,125,091 | Sleeper | Mar. 17, 1964 |
| 3,179,105 | Falbel | Apr. 20, 1965 |
| 3,194,228 | Barques | July 13, 1965 |
| 3,321,012 | Hervey | May 23, 1967 |
| 3,391,688 | Dery | July 9, 1968 |
| 3,906,927 | Caplan | Sept. 23, 1975 |
| 3,923,039 | Falbel | Dec. 2, 1975 |

There has remained a need for a collector assembly which, although having performance comparable to a large planar collector assembly will not necessarily occupy the same kind of space, and can be comparatively easily handled, transported, and mounted at the installation site. The present invention is directed toward attainment of these objectives.

SUMMARY OF THE INVENTION

Described briefly, in a typical embodiment of the present invention, a solar collector panel is provided in a semicylindrical configuration and supported in a housing whereby a portion of the convex face of the panel is exposed to direct solar radiation through a window in the housing, and panel portions not directly exposed are exposed to reflected solar radiation. Mirror surface material lines the interior of the housing (except for the window) to receive through the window and provide the desired reflection of the solar radiation to those areas of the collector panel which are not directly exposed to the solar radiation coming through the window. Suitable thermal insulation is provided in the housing.

BRIEF DESCRIPTION OF THE DRAWINGS

FIG. 1 is a top plan view of the solar energy collector according to a typical embodiment of the present invention.

FIG. 2 is a view thereof taken at line 2—2 in FIG. 1 and viewed in the direction of the arrows.

FIG. 3 is a side elevational view thereof.

FIG. 4 is a transverse section taken therethrough at line 4—4 in FIG. 2 and viewed in the direction of the arrows.

DESCRIPTION OF THE PREFERRED EMBODIMENT

Referring now to the drawings in detail, the collector assembly includes a housing having a lower front wall 11, a floor 12, a semicylindrical rear wall 13, left and right-hand side walls 14 and 16 respectively, and a semicylindrical window assembly 17. The lower front wall, floor, side walls, and rear wall are typically opaque and made of metal, although other materials might also be used. The window is clear transparent and may be of the double insulated pane construction sometimes referred to as "Thermopane" or "Twindow", although the materials used need not be glass for the panes and dry air in the space between the panes. For example, plastic panes can be used and a suitable material for it is known as the "Lexan" material.

A collector panel 18 is affixed in the housing. It extends from the inside face 19 (FIG. 2) of the reflective foil facing material on the insulating pad 21 secured to the left-hand wall of the housing, to the like inside face 22 of the reflective foil material on the inside face of the insulator pad 23 secured to the right-hand wall 16 of the housing. Accordingly the collector panel is insulated from the outside walls 14 and 16 of the housing.

The lower front edge 24 of the collector panel rests on top of or is flush with the upper face 26 of the thermo-insulating pad 27 secured to the bottom or floor 12 of the housing. This edge 24 is spaced about four inches to the rear of the lower front wall 11 of the housing. The panel is curved as best shown in FIG. 4 about a common central horizontal axis for both the panel and the exterior semi-cylindrical surfaces of the window assembly 17 and the rear wall of the housing. Accordingly, a four-inch space 28 is provided between the window and the convex outer face of the panel. A similar space 29 continues from the top center 31 of the housing rearwardly and downwardly between the mirror foil face 32 of the insulating pad portion 33 secured to the underside of the rear of the housing. This space continues downwardly and rearwardly to the lower rear edge 34 of the collector panel which is spaced above the downwardly and forwardly curving portion of the reflector foil surface 36. Accordingly, solar rays incident at the angle represented by lines 37 and which do not directly encounter the convex face of the panel, can pass through the space 29, for reflection downwardly and then reflection upwardly and forwardly to the inner concave face of the collector panel. This feature enhances the performance of the unit in winter months when the energy demand for space heating purposes is high, but the angle of incidence of the sun's rays is lower (as at 37, for example) than that prevailing during the warmer months when the angle is greater such as represented at line 38, for example.

The collector panel may be made of aluminum or copper or any other suitable material. A typical construction for such panels involves a pair of sheets bonded together but with passageway means therein for a working fluid. Such passageway means may include a manifold 41 associated with an inlet tube 42, and a plurality of tubes 43 extending from the inlet manifold 41 to the outlet manifold 44 at the opposite end of the panel and to which an outlet tube 46 is joined. Each one of the plurality of tubes 43 is substantially parallel to the common central horizontal axis of the panel as these tubes extend from the inlet manifold 41 to the outlet manifold 44. Such manifolding and tubing are presently known in solar collector panels except that, to the best of my knowledge, such panels are not made in a semicylindrical shape. Flat panels having this type of construction are marketed by Olin-Brass Corporation under the name "Roll-Bond". Manufacturing techniques other than those used in the "Roll-Bond" type of panels can be employed in panels of the semicylindrical configuration of my invention. It could even involve such rudimentary construction as discrete tubing welded onto a large semicylindrical sheet. In any event, the overall configuration which is disclosed herein enables the utilization of a panel having the same total square footage of overall area as a flat panel, but by exposure of both sides of it to solar radiation, a lesser linear dimension of the overall unit in one direction is required than is normally required where the collector panels are flat. Thus it has space and handling advantages.

The working fluid can be any of those presently known. Distilled water can be used in the passageway from the inlet 42 to the outlet 46 or, where freezing temperatures are anticipated at night, a mixture of water and an anti-freeze material such as ethylene glycol may be used. Another working fluid found suitable is known as "Dowtherm J" as furnished by the Dow Chemical Company. Other working fluids might also be used.

Conventional flat solar collector panels are sometimes provided with an energy absorbing coating on the face exposed to sunlight. An example of such coating referred to in the aforementioned literature is "Duracron Super 600 L/G (UC 40437)" flat black coating marketed by PPG Industries. According to one feature of the present invention, both the convex and concave faces of the panel are absorbent to avoid any reflection from the panel itself. The above mentioned coating can be used on both faces for this purpose.

The thermal insulation can be in the form of the glass fiber type of mat or pad, sometimes known as "Fiberglass", with a reflective aluminum or other bright metal foil thereon facing the inside of the housing. Other combinations might also be used so long as they provide appropriate reflection of the incident sun rays for direction thereof to the concave face of the collector panel.

While there have been described above the principles of this invention in connection with specific apparatus, it is to be clearly understood that this description is made only by way of example and not as a limitation in the scope of the invention.

What is claimed is:

1. A solar energy collector comprising:
    an absorber panel having a plurality of passageways therein for conveying a working fluid therethrough, said panel being semicylindrical about a horizontal axis and having an outwardly facing convex face and a concave face concentric therewith;
    a housing enclosing said panel and having a window therein for exposing a substantial area of the convex face directly to sunlight, said window being part cylindrical about said horizontal axis; and
    reflector means in said housing facing said window and said concave face to reflect sunlight onto said concave face.

2. The collector of claim 1 wherein:
    said panel is elongated and said semicylindrical configuration is in a transverse section.

3. The collector of claim 1 wherein:
    said plurality of passageways connect to an inlet at one end through an inlet manifold and to an outlet at the other end through an outlet manifold thereby providing path means for a working fluid to absorb heat from said panel during passage therethrough from said inlet to said outlet.

4. The collector of claim 3 wherein: said panel has a solar energy absorbing coating on each of said concentric faces.

5. A solar energy collector comprising:
    an absorber panel having a plurality of passageways therein for conveying a working fluid therethrough, said panel being of a curved sectional configuration and having a convex face and a concave face;
    a housing enclosing said panel and having a window therein for exposing a substantial area of the convex face directly to sunlight;
    reflector means in said housing facing said window and said concave face to reflect sunlight onto said concave face;
    said reflector means including a reflective foil facing material on thermal insulator means.

6. The collector of claim 5 wherein:
    said collector panel has a lower front marginal edge adjacent a lower front edge of said housing;
    said housing has a top which is semicylindrical about said horizontal axis and spaced from said panel, said top including said window and an opaque portion, said window extending from adjacent said lower front edge upwardly and rearwardly to the top center of said housing and said opaque portion extending rearwardly and downward from said top center to the lower rear edge of said housing;
    said foil facing material extending in a curved portion parallel to the inner wall of said opaque portion downward and rearward from said window toward the bottom of said housing and then forward to the front of said housing adjacent the bottom of said window; and
    the lower rear edge of said panel being spaced above the forward extending portion of said foil, there being a space between the convex face of said panel behind said window and said foil facing material to admit solar energy from said window for reflection downward by said curved portion of said foil facing material onto the convex face portion of said panel extending downwardly toward the rear edge thereof, and for reflection downward and forward through the space between the lower rear edge of said panel and the forward extending portion of said foil facing material for reflection upward thereby onto the said concave face of said panel.

7. The collector of claim 5 wherein: said plurality of passageways connect to an inlet at one end through an inlet manifold and to an outlet at the other end through an outlet manifold thereby providing path means for a working fluid to absorb heat from said panel during said passage therethrough from said inlet to said outlet.

* * * * *